United States Patent
Xiong et al.

(10) Patent No.: US 11,020,857 B2
(45) Date of Patent: Jun. 1, 2021

(54) ROBOT DISTANCE MEASURING METHOD, APPARATUS AND ROBOT USING THE SAME

(71) Applicant: UBTECH Robotics Corp, Shenzhen (CN)

(72) Inventors: Youjun Xiong, Shenzhen (CN); Xiangbin Huang, Shenzhen (CN); Musen Zhang, Shenzhen (CN); Peng Nie, Shenzhen (CN); Hailang Zhou, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 321 days.

(21) Appl. No.: 16/236,526

(22) Filed: Dec. 30, 2018

(65) Prior Publication Data

US 2020/0001462 A1    Jan. 2, 2020

(30) Foreign Application Priority Data

Jun. 28, 2018 (CN) .......................... 201810687611.6

(51) Int. Cl.
    B25J 9/16          (2006.01)

(52) U.S. Cl.
    CPC .................................. B25J 9/1694 (2013.01)

(58) Field of Classification Search
    CPC ...... B25J 9/1694; B25J 9/1666; B25J 9/1602; G01S 7/023; G01S 17/931; G01S 17/87; G01S 2015/937; G01S 15/87; G01S 2013/9327; G01S 13/87
    See application file for complete search history.

(56) References Cited

U.S. PATENT DOCUMENTS

| | | | | |
|---|---|---|---|---|
| 2004/0207355 | A1* | 10/2004 | Jones | G05D 1/0219 318/568.12 |
| 2007/0285041 | A1* | 12/2007 | Jones | G05D 1/0227 318/568.12 |
| 2008/0058987 | A1* | 3/2008 | Ozick | B25J 13/006 700/250 |
| 2014/0152507 | A1* | 6/2014 | McAllister | H01Q 1/362 342/126 |
| 2016/0107309 | A1* | 4/2016 | Walsh | A61H 3/00 248/550 |
| 2017/0364090 | A1* | 12/2017 | Grufman | G05D 1/0214 |
| 2018/0014709 | A1* | 1/2018 | O'Brien | A47L 9/2884 |
| 2019/0265724 | A1* | 8/2019 | Sheng | G05D 1/0088 |

* cited by examiner

*Primary Examiner* — Ziaul Karim

(57) ABSTRACT

The present disclosure provides a robot distance measuring method and apparatus as well as a robot using the same. The method includes: obtaining a plurality of relative position parameters of a robot from a plurality of ranging sensors; determining an installation distance between each two of the ranging sensors based on the plurality of relative position parameters; determining a sum of the installation distance of each looping arrangement of the plurality of ranging sensors based on the installation distance between each two of the ranging sensors; and enabling the plurality of ranging sensors sequentially to perform obstacle ranging according to a preset looping rule. Since the adjacent ranging sensors are avoided to range simultaneously or sequentially, the interference of the adjacent ranging sensors can be minimized, the accuracy of measuring the distance of the surrounding obstacles can be improved, thereby improving the navigation performance of the robot.

20 Claims, 6 Drawing Sheets

ROBOT DISTANCE MEASURING METHOD, APPARATUS AND ROBOT USING THE SAME

CROSS REFERENCE TO RELATED APPLICATIONS

This application claims priority to Chinese Patent Application No. 201810687611.6, filed Jun. 28, 2018, which is hereby incorporated by reference herein as if set forth in its entirety.

BACKGROUND

1. Technical Field

The present disclosure relates to intelligent robot technology, and particularly to a robot distance measuring method and apparatus as well as a robot using the same.

2. Description of Related Art

With the continuous development of intelligent technology, the results of the researches about intelligent robots have gradually industrialized and gradually applied to the industries including medical treatment, health care, family, entertainment, and service industry. A robot is generally disposed with sensors for ranging (distance measurement), so that the robot can evaluate the surrounding environment by measuring the distance with respect to the surrounding obstacles and then make a motion strategy, that is, it determines whether there's a necessary to turn or stop the motion according to the condition of the surrounding obstacles, hence the accuracy of the distance measurement of the obstacle around the robot has a great influence on the navigation performance of the robot.

At present, the traditional method for measuring the distances of obstacles around a robot is that measuring the distances of the obstacles by multiple sensors disposed on the robot simultaneously or by adjacent and nearby sensors disposed on the robot successively. However, the signal transmitted by a certain sensor may be received by other adjacent sensors when the signal is refracted or reflected by the obstacle in the environment. Therefore, due to the mutual interference between adjacent sensors, the measured distance with respect to the surrounding obstacles may be inaccurate, which may affect the navigation performance of the robot.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "a," "an," and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

For the purpose of describing the technical solutions of the present disclosure, the following describes through specific embodiments.

Figure 1:
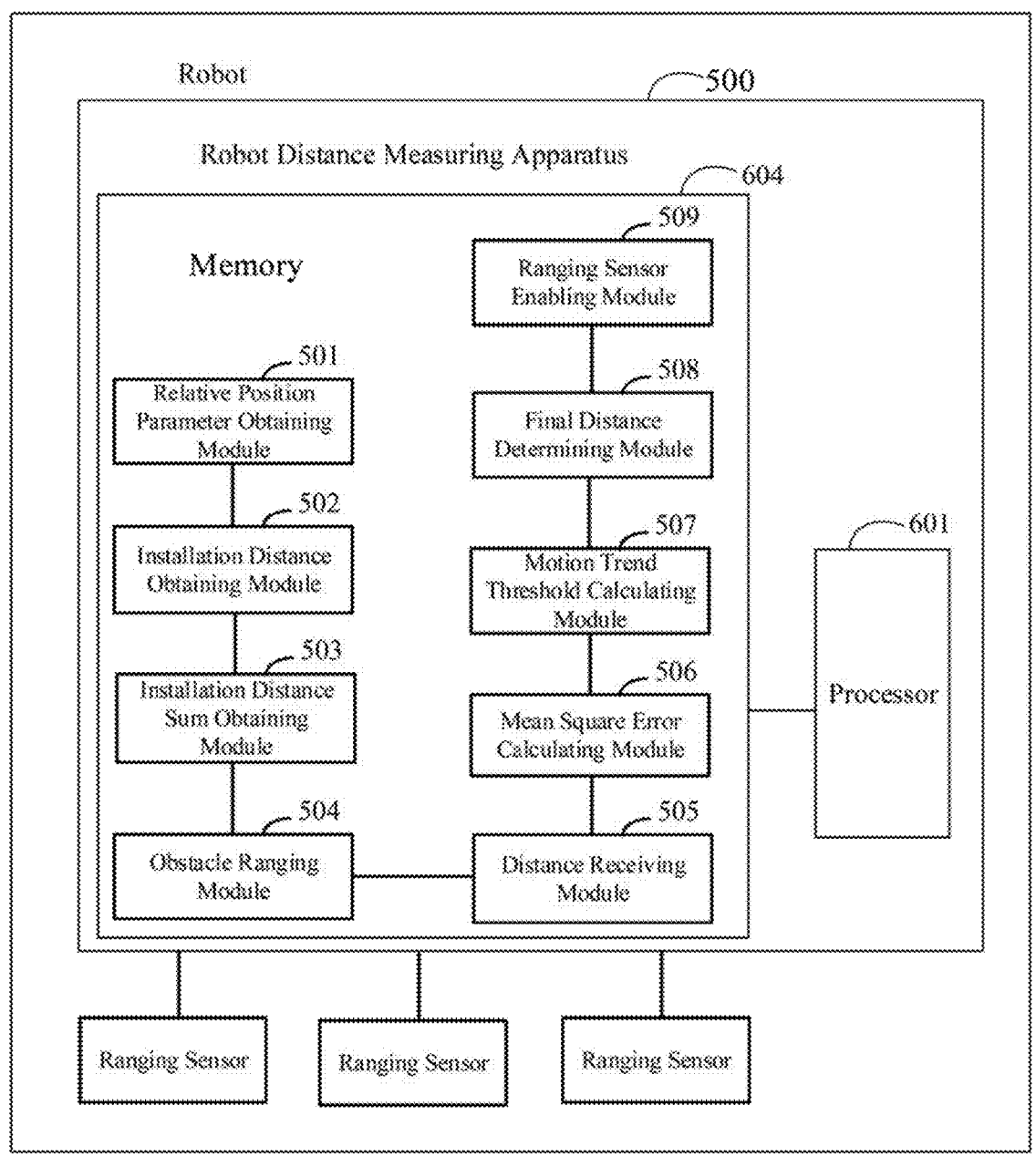
FIG. 1 is a schematic block diagram of a robot distance measuring apparatus according to an embodiment of the present disclosure.

FIG. 1 is a schematic block diagram of a robot distance measuring apparatus according to an embodiment of the present disclosure, which corresponds to the robot distance measuring method of the above-mentioned embodiments. For the convenience of description, only parts related to this embodiment are shown. As shown in FIG. 1, a robot distance measuring apparatus 500 is applied to a robot, in which the robot is disposed with a plurality of ranging sensors. The apparatus 500 includes: a relative position parameter obtaining module 501, an installation distance obtaining module 502, an installation distance sum obtaining module 503, and an obstacle ranging module 504.

the relative position parameter obtaining module 501 is configured to obtain a plurality of relative position parameters of the robot from the plurality of ranging sensors;

the installation distance obtaining module 502 is configured to determine an installation distance between each two of the ranging sensors based on the plurality of relative position parameters;

the installation distance sum obtaining module 503 is configured to determine a sum of the installation distance of each looping arrangement of the plurality of ranging sensors based on the installation distance between each two of the ranging sensors; and the obstacle ranging module 504 is configured to enable the plurality of ranging sensors sequentially to perform obstacle ranging according to a preset looping rule, where the preset looping rule is that the total length of tracks of sequences to enable the plurality of ranging sensors in a looping period is the largest among the sums of the installation distances of all the looping arrangements of the plurality of ranging sensors.

It can be seen from the above-mentioned description that, based on the preset looping rule that the total length of a track of a sequence to enable the plurality of ranging sensors in a looping period is the largest among the sums of the installation distances of all the looping arrangements of the plurality of ranging sensors, the plurality of ranging sensors are sequentially enabled to perform obstacle ranging. Since the adjacent ranging sensors are avoided to range simultaneously or sequentially, the interference of the adjacent ranging sensors can be minimized, the accuracy of measuring the distance of the surrounding obstacles can be improved, thereby improving the navigation performance of the robot.

Referring to FIG. 1, in one embodiment, the apparatus 500 may further include:

a distance receiving module 505 configured to receive a plurality of distances of a target obstacle collected according to the looping period by a target ranging sensor, where the target ranging sensor is any one of the plurality of ranging sensors;

a mean square error calculating module 506 configured to calculate a mean square error of the plurality of distances;

a motion trend threshold calculating module 507 configured to calculate a motion trend threshold of the robot based on a motion speed of the robot and a preset proportion; and a final distance determining module 508 configured to determine a final distance of the target obstacle based on a comparison between the mean square error and the motion trend threshold.

Referring to FIG. 1, in one embodiment, the final distance determining module 508 is configured to: determine the latest obtained distance in the plurality of distances to be invalid, if the mean square error is larger than the motion trend threshold; determine the latest obtained distance in the plurality of distances as the final distance, if the mean square error is smaller than the motion trend threshold.

Referring to FIG. 1, in one embodiment, the apparatus 500 may further include:

a ranging sensor enabling module 509 configured to enable the next ranging sensor according to the preset looping rule to perform obstacle measurement, if the latest obtained distance in the plurality of distances is determined as invalid.

It should be noted that, each of the above-mentioned modules/units may be implemented in the form of hardware (e.g., a circuit), software (e.g., a program), or a combination thereof (e.g., a circuit with a single chip microcomputer).

In one embodiment, the plurality of ranging sensors include one or more of an ultrasonic ranging sensor, an infrared ranging sensor, and a millimeter wave radar.

Figure 2:
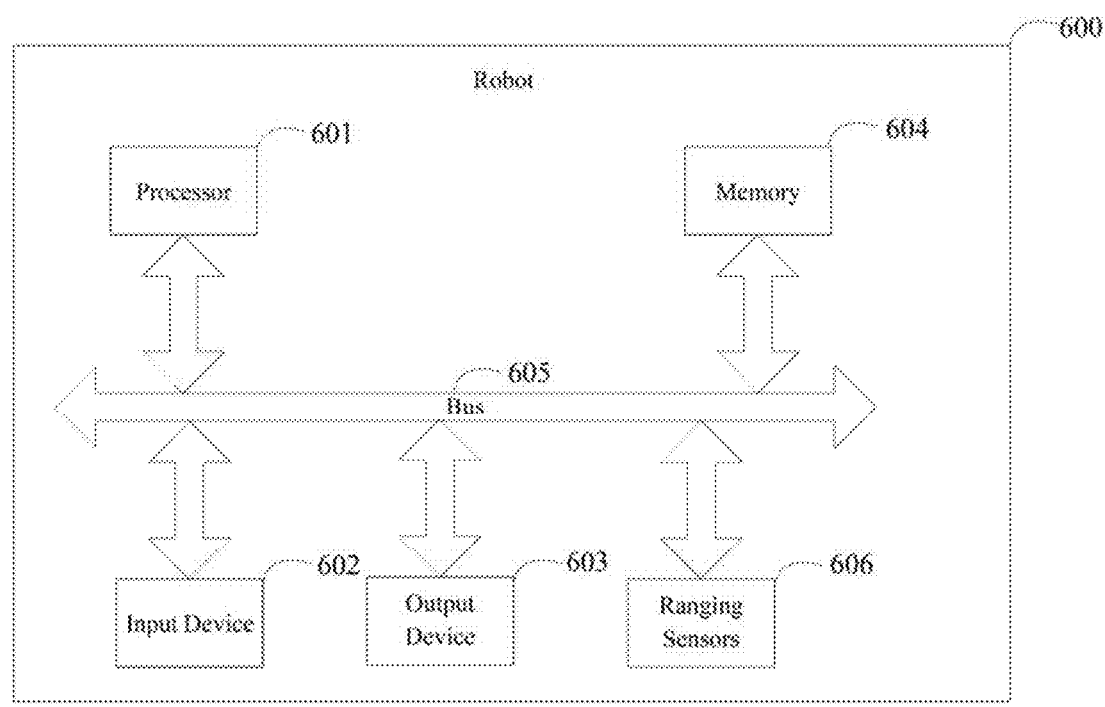
FIG. 2 is a schematic block diagram of a robot according to an embodiment of the present disclosure.

FIG. 2 is a schematic block diagram of a robot according to an embodiment of the present disclosure. As shown in FIG. 2, the robot 600 of this embodiment includes processor(s) 601, input device(s) 602, output device(s) 603, memory (memories) 604, bus(es) 605, and ranging sensors 606. The processor 601, the input device 602, the output device 603, and the memory 604 communicate with each other via the bus 605. The memory 604 is configured to store computer program(s) including instructions. The processor 601 is configured to execute the instructions stored by the memory 604. In which, the processor 601 are configured to call instructions to perform the following operations to implement the functions of the modules/units in the above-mentioned device embodiments, such as the functions of the modules 501-509 shown in FIG. 1.

It should be comprehended that, in this embodiment, the processor 601 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The input device 602 may include a touch panel, a fingerprint sensor (for collecting fingerprint information of the user and direction information of the fingerprint), a microphone, and the like, and the output device 603 may include a display (LCD or the like), a speaker, and the like.

The memory 604 can include read only memory and random access memory and provides instructions and data to the processor 601. A portion of the memory 604 can also include a non-volatile random access memory. For example, the memory 604 can also store information of the device type.

In a specific implementation, the processor 601, the input device 602, and the output device 603 described in the embodiments of the present disclosure may implement the implementation of the present disclosure.

In a specific implementation, the processor 601, the input device 602, and the output device 603 in this embodiment may perform the first embodiment and the implementation manner described in the second embodiment of the service request method provided by this embodiment. The implementation manner of the terminal described in this embodiment may also be implemented, and details are not described herein again.

Figure 3:
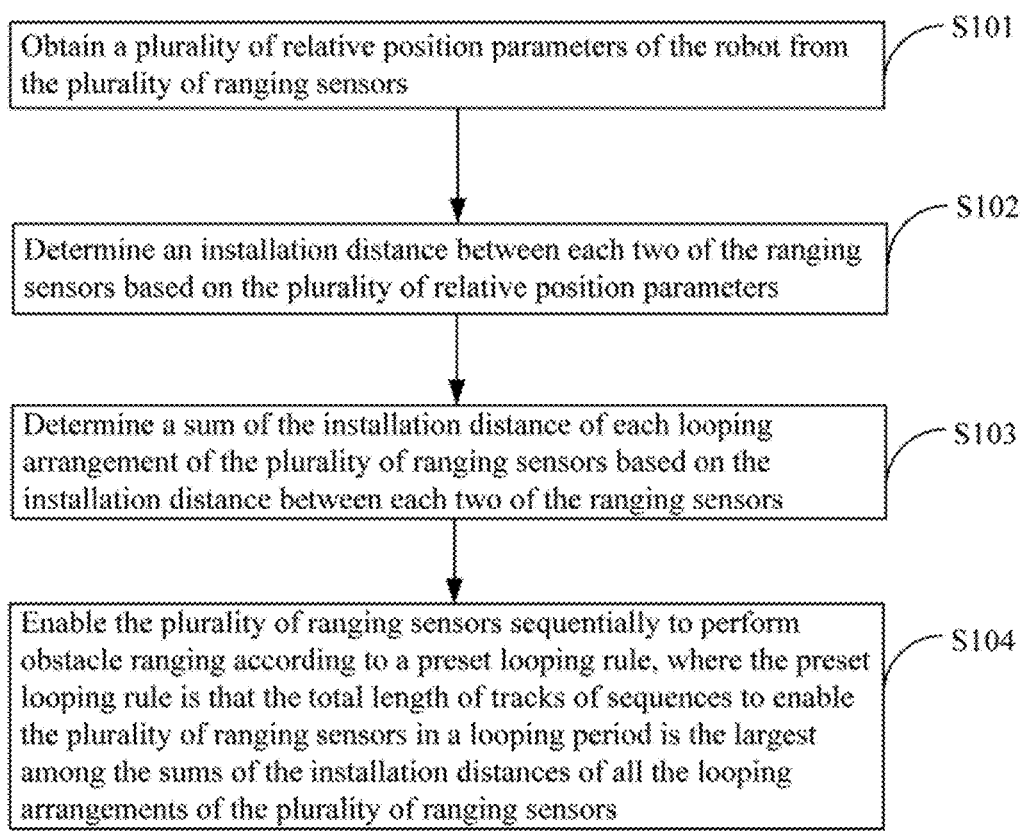
FIG. 3 is a flow chart of an embodiment of a robot distance measuring method according to the present disclosure.

FIG. 3 is a flow chart of an embodiment of a robot distance measuring method according to the present disclosure. In this embodiment, the method is a computer-implemented method executable for a processor, which may be implemented through a robot distance measuring apparatus as shown in FIG. 1. The method can be applied to a robot, in which the robot is disposed with a plurality of ranging sensors. As shown in FIG. 3, the method includes the following steps.

S101: obtaining a plurality of relative position parameters of the robot from the plurality of ranging sensors.

Figure 4:
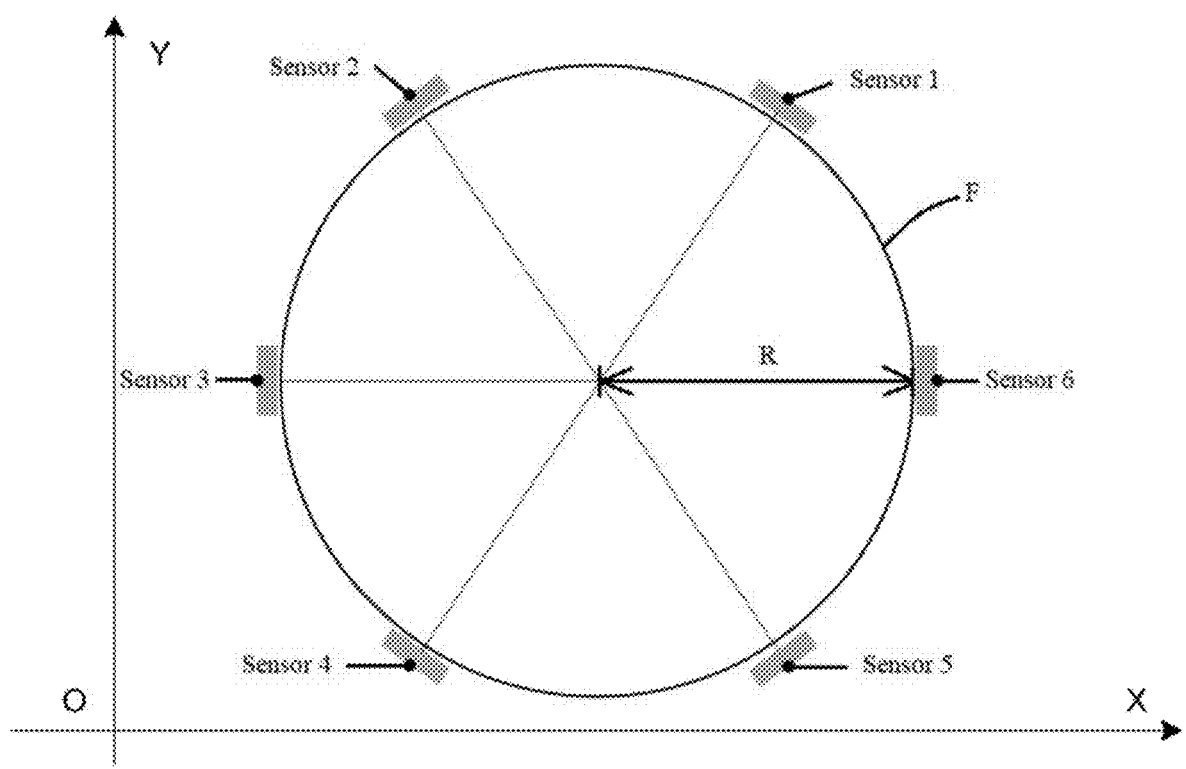
FIG. 4 is a schematic diagram of a layout of ranging sensors of a robot according to an embodiment of the present disclosure.

In this embodiment, the ranging sensor may be one or more of an ultrasonic ranging sensor, an infrared ranging sensor, and a millimeter wave radar. The robot may be any type of robot having navigation function. The relative position parameters may be relative position coordinates of the ranging sensors in a same coordinate system. FIG. 4 is a schematic diagram of a layout of ranging sensors of a robot according to an embodiment of the present disclosure. As shown in FIG. 4, for example, there are six ranging sensors evenly distributed on a circular frame F (which has the radius R) of the robot, and the two-dimensional coordinate system XOY may be created as needed, thereby determining the coordinate value of each ranging sensor, that is, the relative position parameter of the ranging sensor.

S102: determining an installation distance between each two of the ranging sensors based on the plurality of relative position parameters.

In this embodiment, the installation distance refers to the linear distance between two ranging sensors. The installation distance of each two ranging sensors can be calculated based on the relative position coordinates of the ranging sensors in the same coordinate system. For example, as shown in Table 1, the layout of the ranging sensor shown in FIG. 4 is taken as an example, in which the installation distance of each two ranging sensors are as shown.

|  | Sensor 1 | Sensor 2 | Sensor 3 | Sensor 4 | Sensor 5 | Sensor 6 |
|---|---|---|---|---|---|---|
| Sensor 1 | 0 | R | $\sqrt{3}$R | 2R | $\sqrt{3}$R | R |
| Sensor 2 | R | 0 | R | $\sqrt{3}$R | 2R | $\sqrt{3}$R |
| Sensor 3 | $\sqrt{3}$R | R | 0 | R | $\sqrt{3}$R | 2R |
| Sensor 4 | 2R | $\sqrt{3}$R | R | 0 | R | $\sqrt{3}$R |
| Sensor 5 | $\sqrt{3}$R | 2R | $\sqrt{3}$R | R | 0 | R |
| Sensor 6 | R | $\sqrt{3}$R | 2R | $\sqrt{3}$R | R | 0 |

S103: determining a sum of the installation distance of each looping arrangement of the plurality of ranging sensors based on the installation distance between each two of the ranging sensors.

In this embodiment, all of the looping arrangements refer to a combination of all the arrangement manners made by arranging all the ranging sensors from any of the ranging sensors and then returning to the originating ranging sensor. The sum of the installation distances of the looping arrangements refers to the total length of the tracks of the sequences to arrange the ranging sensors from the first ranging sensors and then returning to the first ranging sensor to terminate the arrangement. For example, referring to FIG. 4 and Table 1, assuming that a looping arrangement is sensors 1→2→3→4→5→6→1, then the sum of the installation distances of the looping arrangement is 6R.

S104: enabling the plurality of ranging sensors sequentially to perform obstacle ranging according to a preset looping rule, where the preset looping rule is that the total length of tracks of sequences to enable the plurality of ranging sensors in a looping period is the largest among the sums of the installation distances of all the looping arrangements of the plurality of ranging sensors.

In this embodiment, the largest among the sums of the installation distances of all the looping arrangements is selected, the looping arrangements corresponding to the largest sum is taken as the preset looping rule for sequentially enabling the ranging sensors to perform obstacle ranging. For example, referring to FIG. 4 and Table 1, the largest among the sums of the installation distances of the looping arrangements is $(4+4\sqrt{3})$R, which corresponds to the looping arrangements such as sensors 1→5→6→4→6→3→1 or sensors 1→4→6→2→5→3→1.

It can be seen from the above-mentioned description that, based on the preset looping rule that the total length of a track of a sequence to enable the plurality of ranging sensors in a looping period is the largest among the sums of the installation distances of all the looping arrangements of the plurality of ranging sensors, the plurality of ranging sensors are sequentially enabled to perform obstacle ranging. Since the adjacent ranging sensors are avoided to range simultaneously or sequentially, the interference of the adjacent ranging sensors can be minimized, the accuracy of measuring the distance of the surrounding obstacles can be improved, thereby improving the navigation performance of the robot.

Figure 5:
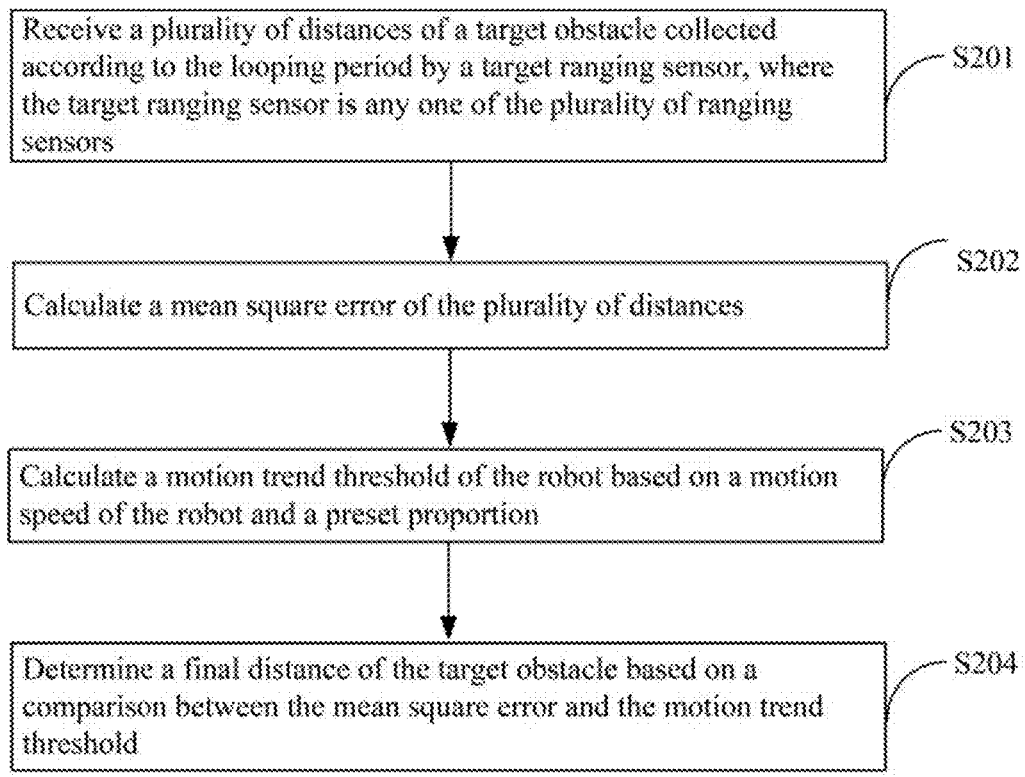
FIG. 5 is a flow chart of another embodiment of a robot distance measuring method according to the present disclosure.

FIG. 5 is a flow chart of another embodiment of a robot distance measuring method according to the present disclosure. As shown in FIG. 5, in an actual application environment, since the robot in movement may be interfered by the signals from other ranging sensors which are refracted or reflected by the obstacle, error will appear in the distance measured by a certain ranging sensor. In order to solve the problem, based on the above-mentioned embodiment, the method further includes the following steps.

S201: receiving a plurality of distances of a target obstacle collected according to the looping period by a target ranging sensor, where the target ranging sensor is any one of the plurality of ranging sensors.

In this embodiment, the looping period may be set according to actual needs, for example, set according to the motion speed of the robot, and the looping period may be inversely proportional to the motion speed of the robot.

S202: calculating a mean square error of the plurality of distances.

In this embodiment, the mean square error reflects the dispersion level of the plurality of distances, and the mean square error is proportional to the motion speed of the robot.

S203: calculating a motion trend threshold of the robot based on a motion speed of the robot and a preset proportion.

In this embodiment, the motion speed of the robot is multiplied by the preset proportion to obtain the motion trend threshold of the robot. The preset proportion is related to the environment in which the robot is located. The motion trend threshold of the robot reflects the motion speed of the robot in different environments.

S204; determining a final distance of the target obstacle based on a comparison between the mean square error and the motion trend threshold.

In this embodiment, the final distance of the target obstacle can be determined through the magnitude of the mean square error and the motion trend threshold. In which, the final distance of the target obstacle can be determined by determining whether the latest collected distance among the plurality of distances of the target obstacle which are collected according to the looping period is valid or not.

It can be seen from the above-mentioned description that, by comparing the motion speed of the robot and the mean square error of the plurality of distances, the distances of the target obstacle that obviously have measurement error can be filtered out, and the accuracy of the navigation of the robot is further improved.

Figure 6:
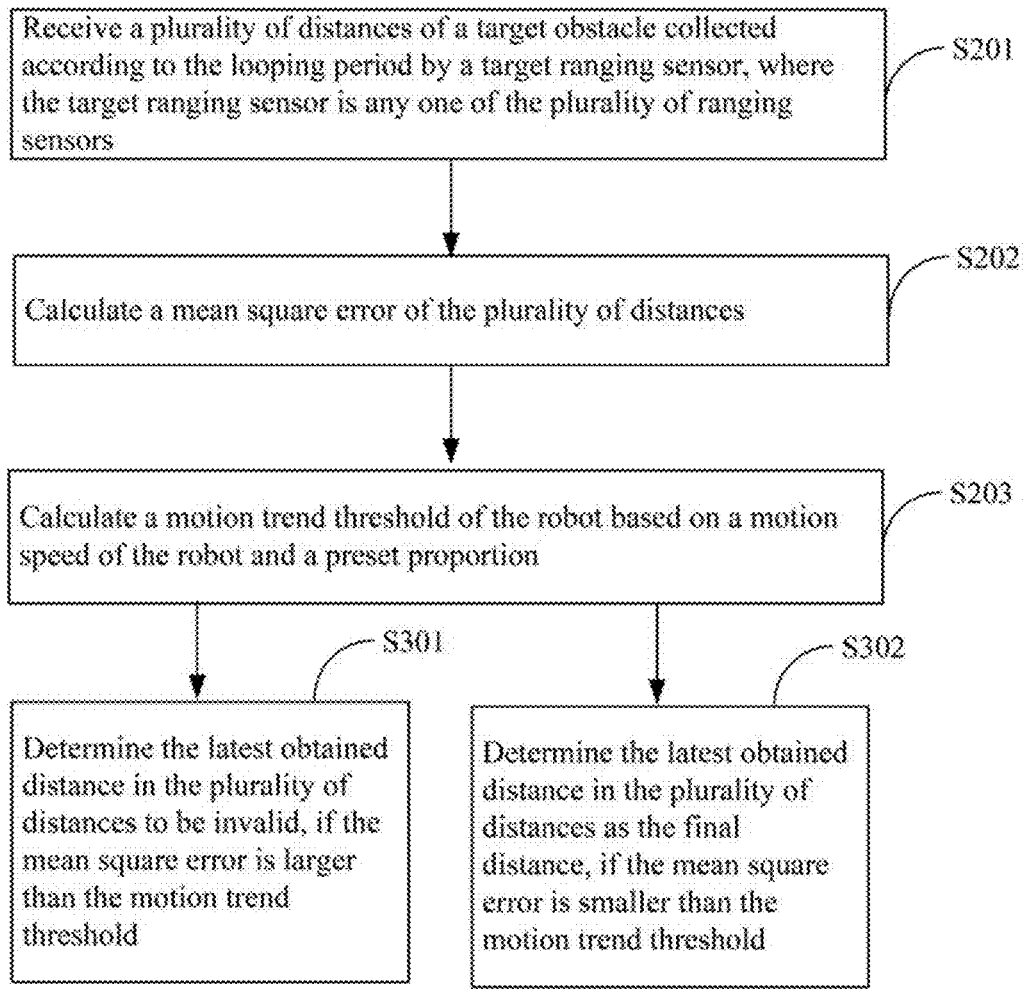
FIG. 6 is a flow chart of the other embodiment of a robot distance measuring method according to the present disclosure.

FIG. 6 is a flow chart of the other embodiment of a robot distance measuring method according to the present disclosure. As shown in FIG. 6, based on the above-mentioned embodiment, the above-mentioned step S204 includes the following steps.

S301: determining the latest obtained distance in the plurality of distances to be invalid, if the mean square error is larger than the motion trend threshold.

S302: determining the latest obtained distance in the plurality of distances as the final distance, if the mean square error is smaller than the motion trend threshold.

In this embodiment, if the mean square error is larger than the motion trend threshold, the latest collected distance (the latest distance collected according to the looping period) in the plurality of distances of the target obstacle which is collected according to the looping period has been interfered and therefore has error, and it is invalid; otherwise, it is valid.

The embodiments corresponding to FIG. 4-FIG. 5 are described in detail below through a specific example as follows.

Assuming that the amount of the distances is 5, where the distance 1=1 m (meter), the distance 2=2 m, the distance 3=3 m, the distance 4=5 m, the distance 5=5 m, the looping period is 60 ms (millisecond), and the average speed of the robot is 1 m/s (meter/second).

It can be calculated to obtain the mean square error of the five distances which equals $\sqrt{2}$.

If the preset proportion K=1, then $\sqrt{2}>1*1$, and the latest obtained distance is invalid.

If the preset proportion K=2, then $\sqrt{2}<2*1$, and the latest obtained distance is valid and the latest distance 5=5 m.

In one embodiment, if it is determined that the latest obtained distance among the plurality of distances is invalid, the next ranging sensor is enabled according to the preset looping rule to perform obstacle measurement.

In this embodiment, if it is determined that the measurement of the target ranging sensor is invalid, the re-measurement will not be performed immediately, but the latest obtained distance is discarded and the next ranging sensor is enabled, thereby improving the ranging efficiency, and further ensuring the timely response of the navigation of the robot.

In another embodiment of the present disclosure, a non-transitory computer-readable storage medium is provided. The non-transitory computer-readable storage medium stores a computer program including program instructions. All or part of the processes in the method for implementing the above-mentioned embodiments of the present disclosure are implemented when the program instructions are executed by the processor, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The non-transitory computer-readable storage medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the non-transitory computer readable storage medium may be appropriately increased or decreased according to the requirements of legislation and patent practice in the jurisdiction. For example, in some jurisdictions, according to the legislation and patent practice, a non-transitory computer readable storage medium does not include electric carrier signals and telecommunication signals.

The computer-readable storage medium may be an internal storage unit of the robot of any of the above-mentioned embodiment, for example, a hard disk or a memory of the robot. The computer-readable storage medium may also be an external storage device of the robot, for example, a plug-in hard disk, a smart media card (SMC), a secure digital (SD) card, flash card, and the like, which is equipped on the robot. Furthermore, the computer-readable storage medium may further include both an internal storage unit and an external storage device, of the robot. The computer-readable storage medium is configured to store the computer program and other programs and data required by the robot. The computer-readable storage medium may also be used to temporarily store data that has been or will be output.

Those ordinary skilled in the art may clearly understand that, the exemplificative units and steps described in the embodiments disclosed herein may be implemented through electronic hardware, computer software, or a combination of the two. In order to clearly illustrate the interchangeability of hardware and software, the composition and steps of the examples have been generally described in terms of functions in the above-mentioned description. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

Those skilled in the art may clearly understand that, for the convenience and simplicity of description, for the specific operation process of the above-mentioned robot and units, reference may be made to the corresponding processes in the above-mentioned method embodiments, and are not described herein.

In the embodiments provided by the present disclosure, it should be understood that the disclosed robot and method may be implemented in other manners. For example, the above-mentioned apparatus embodiment is merely exemplary. For example, the division of units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, the functional units in each of the embodiments may be integrated in one processing unit, or each unit may exist alone physically, or two or more units may be integrated in one unit. The above-mentioned integrated unit may be implemented in the form of hardware or in the form of software functional unit.

The forgoing is only the specific embodiment of the present disclosure, while the scope of the present disclosure is not limited thereto. For those skilled in the art, various equivalent modifications or replacements that can be easily conceived within the technical scope of the present disclosure should be included within the scope of the present disclosure. Therefore, the scope of the present disclosure should be determined in accordance with the scope of the claims.

What is claimed is:

1. A computer-implemented distance measuring method for a robot disposed with a plurality of ranging sensors, comprising executing on a processor the steps of:
   obtaining a plurality of relative position parameters of the robot from the plurality of ranging sensors;
   determining an installation distance between each two of the ranging sensors based on the plurality of relative position parameters;
   determining a sum of the installation distance of each looping arrangement of the plurality of ranging sensors based on the installation distance between each two of the ranging sensors;
   enabling the plurality of ranging sensors sequentially to perform obstacle ranging according to a preset looping rule, wherein the preset looping rule is the total length of tracks of sequences to enable the plurality of ranging sensors in a looping period being the largest among the sums of the installation distances of all the looping arrangements of the plurality of ranging sensors;
   receiving a plurality of distances of a target obstacle collected according to the looping period by a target ranging sensor, wherein the target ranging sensor is any one of the plurality of ranging sensors;
   calculating a mean square error of the plurality of distances;
   calculating a motion trend threshold of the robot based on a motion speed of the robot and a preset proportion; and
   determining a final distance of the target obstacle based on a comparison between the mean square error and the motion trend threshold.

2. The method of claim 1, wherein the step of determining the final distance of the target obstacle based on the comparison between the mean square error and the motion trend threshold comprises:
   determining the latest obtained distance in the plurality of distances to be invalid, in response to the mean square error being larger than the motion trend threshold; and
   determining the latest obtained distance in the plurality of distances as the final distance, in response to the mean square error being smaller than the motion trend threshold.

3. The method of claim 2, further comprising:
   enabling the next ranging sensor according to the preset looping rule to perform obstacle measurement, in response to the latest obtained distance in the plurality of distances being determined as invalid.

4. The method of claim 1, wherein the plurality of ranging sensors comprise one or more of an ultrasonic ranging sensor, an infrared ranging sensor, and a millimeter wave radar.

5. The method of claim 1, wherein the plurality of relative position parameters of the robot are relative position coordinates of the ranging sensors in a same coordinate system.

6. The method of claim 1, wherein there are six ranging sensors evenly distributed on a circular frame of the robot.

7. The method of claim 1, wherein the mean square error reflects dispersion level of the plurality of distances, and the mean square error is proportional to the motion speed of the robot.

8. A distance measuring apparatus for a robot disposed with a plurality of ranging sensors, comprising:
   a memory;
   a processor; and
   one or more computer programs stored in the memory and executed by the processor, cause the processor to:
   obtain a plurality of relative position parameters of the robot from the plurality of ranging sensors;
   determine an installation distance between each two of the ranging sensors based on the plurality of relative position parameters;
   determine a sum of the installation distance of each looping arrangement of the plurality of ranging sensors based on the installation distance between each two of the ranging sensors;
   enable the plurality of ranging sensors sequentially to perform obstacle ranging according to a preset looping rule, wherein the preset looping rule is the total length of tracks of sequences to enable the plurality of ranging sensors in a looping period being the largest among the sums of the installation distances of all the looping arrangements of the plurality of ranging sensors;
   receive a plurality of distances of a target obstacle collected according to the looping period by a target ranging sensor, wherein the target ranging sensor is any one of the plurality of ranging sensors;
   calculate a mean square error of the plurality of distances;
   calculate a motion trend threshold of the robot based on a motion speed of the robot and a preset proportion; and
   determine a final distance of the target obstacle based on a comparison between the mean square error and the motion trend threshold.

9. The apparatus of claim 8, wherein the final distance of the target obstacle is determined by:
   determining the latest obtained distance in the plurality of distances to be invalid, in response to the mean square error being larger than the motion trend threshold; and
   determining the latest obtained distance in the plurality of distances as the final distance, in response to the mean square error being smaller than the motion trend threshold.

10. The apparatus of claim 9, wherein when the one or more computer programs are executed by the processor, further cause the processor to:
    enable the next ranging sensor according to the preset looping rule to perform obstacle measurement, in response to the latest obtained distance in the plurality of distances being determined as invalid.

11. The apparatus of claim 8, wherein the plurality of ranging sensors comprise one or more of an ultrasonic ranging sensor, an infrared ranging sensor, and a millimeter wave radar.

12. The apparatus of claim 8, wherein the plurality of relative position parameters of the robot are relative position coordinates of the ranging sensors in a same coordinate system.

13. The apparatus of claim 8, wherein there are six ranging sensors evenly distributed on a circular frame of the robot.

14. The apparatus of claim 8, wherein the mean square error reflects dispersion level of the plurality of distances, and the mean square error is proportional to the motion speed of the robot.

15. A robot comprising:
    a plurality of ranging sensors;
    a memory;
    a processor; and
    one or more computer programs stored in the memory and executable on the processor, wherein the one or more computer programs comprise:
    instructions for obtaining a plurality of relative position parameters of the robot from the plurality of ranging sensors;

instructions for determining an installation distance between each two of the ranging sensors based on the plurality of relative position parameters;

instructions for determining a sum of the installation distance of each looping arrangement of the plurality of ranging sensors based on the installation distance between each two of the ranging sensors;

instructions for enabling the plurality of ranging sensors sequentially to perform obstacle ranging according to a preset looping rule, wherein the preset looping rule is the total length of tracks of sequences to enable the plurality of ranging sensors in a looping period being the largest among the sums of the installation distances of all the looping arrangements of the plurality of ranging sensors;

instructions for receiving a plurality of distances of a target obstacle collected according to the looping period by a target ranging sensor, wherein the target ranging sensor is any one of the plurality of ranging sensors;

instructions for calculating a mean square error of the plurality of distances;

instructions for calculating a motion trend threshold of the robot based on a motion speed of the robot and a preset proportion; and instructions for determining a final distance of the target obstacle based on a comparison between the mean square error and the motion trend threshold.

16. The robot of claim 15, wherein the instructions for determining the final distance of the target obstacle based on the comparison between the mean square error and the motion trend threshold comprises:

instructions for determining the latest obtained distance in the plurality of distances to be invalid, in response to the mean square error being larger than the motion trend threshold; and instructions for determining the latest obtained distance in the plurality of distances as the final distance, in response to the mean square error being smaller than the motion trend threshold.

17. The robot of claim 16, wherein the one or more computer programs further comprise:

instructions for enabling the next ranging sensor according to the preset looping rule to perform obstacle measurement, in response to the latest obtained distance in the plurality of distances being determined as invalid.

18. The robot claim 15, wherein the plurality of ranging sensors comprise one or more of an ultrasonic ranging sensor, an infrared ranging sensor, and a millimeter wave radar.

19. The robot of claim 15, wherein the plurality of relative position parameters of the robot are relative position coordinates of the ranging sensors in a same coordinate system.

20. The robot of claim 4, wherein there are six ranging sensors evenly distributed on a circular frame of the robot.

* * * * *